May 2, 1961 C. H. BOOTH 2,982,005
CUTTING AND ABRADING MACHINES
Filed Feb. 5, 1953

Inventor.
Christopher Hodgson Booth

United States Patent Office 2,982,005
Patented May 2, 1961

2,982,005

CUTTING AND ABRADING MACHINES

Christopher Hodgson Booth, Bath, England, assignor, by mesne assignments, to Simmonds Aerocessories Limited, Pontypridd, Glamorgan, Wales, a corporation of Great Britain Filed Feb. 5, 1953, Ser. No. 335,268

Claims priority, application Great Britain Feb. 6, 1952

3 Claims. (Cl. 29—76)

The invention relates to cutting and abrading machines of the type in which an endless cutting or abrading band moves around spaced pulleys or drums and provides a cutting surface on the run between adjacent drums. The invention has for an object the provision of such a machine which presents a cutting surface which is curved or otherwise departs from flat form transverse to the direction of movement of the band.

In my patent specification Serial No. 126,032, now abandoned, I have described a cutting element consisting of a thin flexible strip having a multiplicity of holes formed therein and hard sharp cutting edges upset from the strip and each constituted by portions of the edge of a hole. I have also described in that specification and illustrated in the drawings thereof the application of such strip material as an endless band in a machine of the above type which presents a flat cutting surface supported by a flat backing member.

The present invention also uses cutting strips as above described and is based on the flexible nature of the strips.

The invention consists in a cutting or abrading machine of the above type in which the cutting or abrading band consists of a thin flexible strip having a multiplicity of holes formed therein and hard sharp cutting edges upset from the strip and each constituted by portions of the edge of a hole and in which the strip has an initial set transverse to its length to a curved or otherwise non-flat form or is deformed to such a form in the cutting run, the departure of the section of the strip from flat form being within the limit of elasticity of the material of the strip so that the strip may readily flex and return to flat cross-section where it passes around the pulleys or drums.

Preferably the machine includes a backing or support plate for the cutting run of the band and the supporting surface of the plate is curved or otherwise shaped to conform with the band.

The cutting band may be of the construction described in my patent specification Serial No. 285,672, now Patent No. 2,678,571, issued May 18, 1954, but as the ridge formation described therein increases the lateral stiffness of the material the construction is not suitable for those applications of the invention where a considerable degree of flexibility in the strip is required.

One specific construction of a machine according to the invention will now be described, by way of example, with reference to the accompanying drawings in which.

Figure 1:
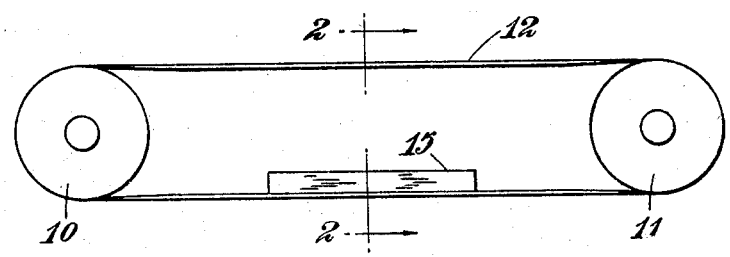
Figure 1 represents a plan of the machine.
Figure 2:
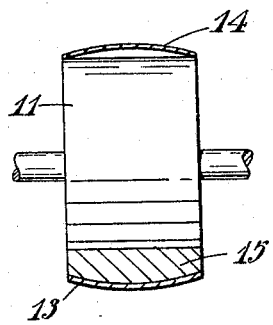
Figure 2 represents a section on the line 2—2 in Figure 1.
Figure 3:
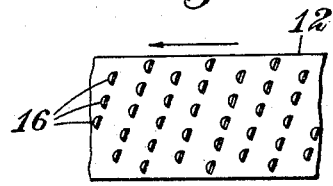
Figure 3 is a view, on an enlarged scale, of a portion of the cutting strip.

The machine comprises two cylindrical rotatable drums 10 and 11 of which one (or both) is driven. Around the drums there is an endless cutting band 12. This band has an initial set to a transverse convex form as shown at 13 and 14 in Figure 2. On the cutting run of the band it passes over a convex support member 15 which conforms to the inner shape of the band and supports the band against pressures applied by the work during cutting. The extent of the convex curvature is within the elastic limit of the material of the band so that it is able without permanent change of shape to return to a flat section as it passes around the drums.

The band is made of mild steel and has cutting edges 16 upset from its surface as described in my patent specification Serial No. 126,032 and differentially hardened with respect to the body of the band. This differential hardening may be obtained by surface hardening the whole strip.

It is within the invention to give the band an initial set to a concave curvature.

The bands may be used to cut curved shapes of various forms.

I claim:

1. An abrading machine of the type in which an endless abrading band moves around spaced drums and provides an abrading surface on the run between adjacent drums characterised in that the abrading band consists of a thin flexible metal strip having a multiplicity of holes formed therein and hard sharp cutting edges upset from the strip and each constituted by portions of the edge of a hole and further characterised in that the strip has an initial set transverse to its length to a curved form, the departure of the section of the strip from flat form being within the limit of elasticity of the material of the strip so that the strip may readily flex and return to flat cross-section where it passes around the drums.

2. A machine as claimed in claim 1 and including a support plate for the cutting run of the band, the supporting surface of the plate being curved to conform with the band.

3. A machine as claimed in claim 1 in which the strip is made of mild steel and the cutting edges are hard relative to the body of the strip.

References Cited in the file of this patent

UNITED STATES PATENTS

| 289,104 | How | Nov. 27, 1883 |
| 1,082,670 | Wysong | Dec. 30, 1913 |
| 1,402,589 | Farrand | Jan. 3, 1922 |
| 1,820,377 | Curtis | Aug. 25, 1937 |
| 2,518,448 | Caston | Aug. 15, 1950 |
| 2,678,571 | Booth | May 18, 1954 |
| 2,769,225 | Booth | Nov. 6, 1956 |

FOREIGN PATENTS

| 265,265 | Switzerland | Mar. 1, 1950 |
| 641,587 | France | Apr. 21, 1928 |
| 697,773 | France | Nov. 5, 1930 |